| United States Patent [19] | [11] 4,005,039 |
| --- | --- |
| Gardiner | [45] Jan. 25, 1977 |

[54] CURABLE COMPOSITIONS FOR BULKING TIMBER COMPRISING (A) A MODIFIED POLYOL CONTAINING -0-3-ALKYLENEAMIDO GROUPS AND (B) AN AMINO RESIN PRECURSOR CONTAINING REACTIVE N-HYDROXYMETHYL GROUPS

[75] Inventor: Duncan Gardiner, St. Albans, England

[73] Assignee: Research Corporation, New York, N.Y.

[22] Filed: June 10, 1975

[21] Appl. No.: 585,527

[30] Foreign Application Priority Data

June 28, 1974 United Kingdom ............ 28902/74

[52] U.S. Cl. .................................. 260/17.3; 21/7; 260/69 R; 427/440
[51] Int. Cl.² ........................................... C08L 5/00
[58] Field of Search .................. 260/17.3, 69 R; 427/440; 21/7

[56] References Cited

UNITED STATES PATENTS

| 3,460,979 | 8/1969 | Giese et al. ............... 427/440 |
| 3,493,417 | 3/1970 | Moren et al. .............. 260/17.3 |
| 3,769,143 | 10/1973 | Kulesza ..................... 427/397 |

OTHER PUBLICATIONS

Chem. Absts., vol. 65: 15660f, Aktiebolag, "Wood-Impregnation with Polyalcohol Ethers or Esters."

*Primary Examiner*—Edward M. Woodberry
*Attorney, Agent, or Firm*—Finnegan, Henderson, Farabow & Garrett

[57] ABSTRACT

Compositions suitable for use in bulking timber, and method for bulking timber comprising impregnating timber with said compositions, drying the treated timber, and curing the bulking compositions by heating, are provided. The composition comprises at least one modified polyol in which at least two of the free hydroxyl groups have been converted to -O-3-alkylenamido ether groups; an amino resin precursor containing reactive N-hydroxymethyl groups; a curing catayst for catalyzing the curing of the composition when heated; and a polar solvent capable of swelling wood. The starting polyol is preferably sucrose, and the amino resin is preferably ureaformaldehyde precursor. The compositions remain stable for prolonged periods of time at ambient temperatures, and timber bulked with the compositions in accordance with the method have excellent dimensional stability.

11 Claims, No Drawings

CURABLE COMPOSITIONS FOR BULKING TIMBER COMPRISING (A) A MODIFIED POLYOL CONTAINING -O-3-ALKYLENEAMIDO GROUPS AND (B) AN AMINO RESIN PRECURSOR CONTAINING REACTIVE N-HYDROXYMETHYL GROUPS

This invention relates to new curable compositions suitable for use as timber bulking compositions, and to methods of using the new compositions for the bulking of timber.

BACKGROUND OF INVENTION

Wood is one of the most important constructional materials available. However, wood has a great affinity for water, and it shrinks and swells with changes in humidity. This dimensional instability of wood is a major problem associated with its use as a structural material.

Green timber as felled contains substantial amounts of water, most of which is driven off when the timber is dried for use. The water which is most readily lost on drying is held within the cell voids or lumens. On drying to a moisture content of about 20–25% by weight, the "fiber saturation point" is reached. At that point, the remaining water is held within the cell wall substance. Further drying, for example to a moisture content of about 12%, is accompanied by a partial collapse of the cell walls and an associated overall shrinkage in the wood dimensions of about 7–10% of the fully swollen volume. This effect is essentially reversible, so that dried wood exposed to high relative humidities or to liquid water re-expands.

The dimensional instability of wood can lead to splitting, warping and grain raising. In addition, the dimensional changes are unevenly distributed through the wood substance, being greater for the relatively dense summer or late wood than for the spring or early wood. This differential leads to high localized stresses in the wood, especially at the junction of successive seasons' growth, which can contribute significantly to paint failures.

A variety of approaches have been attempted to dimensionally stabilize wood. Exemplary of such techniques are surface coating or painting of wood to attempt to prevent the entry of water; chemical modification of wood; and cross-linking of wood. Another approach to dimensional stabilization of wood aims at replacing the water in wood with non-volatile chemicals. This is termed "bulking".

Various compositions have been reported for use as wood bulking compositions. Included among such compositions are polyethylene glycol, salts, sugars, glycols, waxes, phenol-formaldehyde and urea-formaldehyde systems. Chemicals such as sugars, salts and polyethylene glycol have been shown to provide good bulking, i.e., dimensional stability. However, they are readily leached out by moisture causing the bulking effect to be lost if the wood is exposed to high humidities. In addition, the presence of large amounts of polyethylene glycol in wood appears to impart a wet feeling to the wood surface and, further, retards the drying or curing of many types of paint films.

None of the known compositions are completely satisfactory, and the search for alternative and improved bulking compositions has continued. The present invention provides new curable compositions having an excellent combination of properties making them suitable for use as timber bulking compositions. Moreover, the compositions of this invention remain stable for prolonged periods at ambient temperatures. In another aspect, the present invention provides a method of bulking timber utilizing the aforementioned compositions.

SUMMARY OF THE INVENTION

In accordance with one aspect of the present invention, there is provided a curable composition suitable for use as a timber bulking composition comprising:

a. at least one modified polyol in which at least two of the free hydroxyl groups have been converted to -O-3-alkyleneamido ether groups;

b. an amino resin precursor containing reactive N-hydroxymethyl groups;

c. a curing catalyst for curing the composition when heated; and d. a polar solvent capable of swelling wood.

Any polyol or mixture of polyols modified as defined above can be used in the practice of the invention. Suitable starting polyols which may be modified by conversion of an average of at least two, and preferably three, of the free hydroxyl groups to -O-3-alkyleneamido ether groups include sorbitol, mannitol, and glycerol. Preferably, the starting polyol is sucrose, which is a readily available polyol.

Any amino resin precursor having reactive N-hydroxymethyl groups may be used in accordance with this invention. Preferably, the amino resin precursor is a urea-formaldehyde resin precursor or a modified cyclic urea-derived resin precursor, such as 4,5-dihydroxy-1,3-dihydroxymethyl-imidazoldin-2-one. It is preferred that the timber bulking composition comprise about 0.5 to about 2 moles of amino resin precursor per mole of modified polyol.

In accordance with the invention, the curing catalyst should be one which will not promote curing of the resinous components while the composition is in storage, but which will catalyze curing upon heating of the composition. Preferably, in accordance with the invention, the catalyst is an acid catalyst, such as phosphoric, or a latent acid, i.e., one which will provide an acid under curing conditions, such as mono-ammonium dihydrogen phosphate.

Suitable polar solvents for use in the practice of this invention are those which effect swelling of wood. Preferably, the solvent is water or a water-miscible lower alcohol.

The compositions of this invention have been found to be very stable at room temperature for long periods of time even with the inclusion of an acid catalyst. Aqueous impregnating solutions made in accordance with the present invention do not precipitate out significantly for at least a month, and this represents an important advantage.

In general, the compositions of the present invention have a polar character and sufficiently low viscosity to penetrate and impregnate timber blocks. This is important since inadequate penetration would only provide bulking in a thin layer near the wood surface, thus failing to prevent the dimensional changes and cracking of timber, as opposed to, for example, thin veneers. The polar solvent desirably swells the wood, thereby facilitating penetration.

Upon drying of the impregnated wood and thermal cure of the reactive components of the composition, i.e., the modified polyol component and the amino resin precursor, an essentially water-insoluble resinous reaction product is formed which is not leached out of the timber. The cured resinous product replaces water in the void space and wood cells, rendering the timber dimensionally insensitive to humidity changes.

In addition to dimensional stability, timber bulked with the composition of this invention has a substantially increased hardness or indentation resistance. Softwood treated by the present invention is made comparable in hardness and indentation resistance to much more expensive natural hardwoods.

In accordance with another aspect of the present invention, therefore, there is provided a method of bulking timber comprising the steps of:

a. impregnating a piece of timber with a bulking composition comprising:
  i. at least one modified polyol in which at least two of the free hydroxyl groups have been converted to -0-3-alkyleneamido ether groups;
  ii. an amino resin precursor containing reactive N-hydroxymethyl groups;
  iii. a curing catalyst for catalyzing the curing of the composition when heated; and
  iv. a polar solvent capable of swelling the wood;
b. drying the treated timber; and
c. curing the bulking composition by heating the timber at a temperature of from about 60° C to about 120° C.

The more porous the wood, the greater the degree of impregnation, and it is, therefore, preferred that wood treated in accordance with the method of the present invention have a porous character such that substantially complete impregnation with the treating composition can be achieved. Sapwoods are exemplary of woods which are particularly porous and amenable to the timber bulking method herein.

DETAILED DESCRIPTION OF THE INVENTION

Curable timber bulking compositions in accordance with the present invention comprise at least one modified polyol in which at least two of the free hydroxyl groups have been converted to -0-3-alkyleneamido ether groups. Mixtures of modified polyols in each of which at least two of the free hydroxyl groups have been converted to -0-3-alkyleneamido ether groups may be used in the practice of the invention. Where mixtures are used, the modified polyols may be the same or different.

Suitable starting polyols which may be modified by conversion of at least two of the free hydroxyl groups to -0-3-alkyelenamido ether groups include both saturated and unsaturated polyols. Such starting polyols may have a molecular weight of from about 50 to about 10,000, preferably from about 90 to about 500. Preferably, the starting polyol has from 2 to 20 free hydroxyl groups, and especially preferred are those with from about 3 to about 10 free hydroxyl groups.

Illustrative starting polyols for use in the present invention include sorbitol, mannitol, and glycerol. Preferably, the starting polyol is sucrose, which is a readily available material and has been found to give good results in the practice of the invention.

The starting polyol is modified by conversion of at least two of the free hydroxyl groups to -0-3-alkyleneamido groups. Preferably, an average of two to six of the free hydroxyl groups are converted, and especially good results have been obtained when two to three, particularly three, of the free hydroxyl groups have been so converted.

The alkylene moiety of the -0-3-alkyleneamido ether groups may contain from 3 to 5 carbon atoms. It is within the purview of the concept of this invention to have conversion of different free hydroxyl groups of a given starting polyol to different -0-3-alkyleneamido ether groups. The conversion of the free hydroxyl groups of the starting polyol to -0-3-alkyleneamido ether groups may be effected by reaction of the starting polyol with an unsaturated organic nitrile. It is preferred that the organic nitrile be acrylonitrile because of the readily availability of acrylonitrile and the desirable polar nature of the resulting -0-3-propionamido ether groups on the starting polyol. It has been found that polyols modified by reaction with acrylonitrile to convert at least two of the free hydroxyl groups to -0-3-propionamido ether groups achieve good impregnation of wood.

The reaction of the starting polyol with acrylonitrile is effected under aqueous alkaline conditions and is prolonged so that the majority of the nitrile groups initially present in the reaction mixture are hydrated to primary amide groups. Further hydrolysis to carboxylic acids is controlled by limiting the alkali content of the reaction mixture to a molar proportion of from 0.01 to 1 mole, preferably about 0.1 mole, per mole of acrylonitrile. The alkali concentration is very important to the successful practice of the invention.

The conversion reaction may be accomplished by adding the acrylonitrile in a molar proportion of from about 2 to 10 moles to an aqueous alkaline solution of from about 10 to about 90 moles of the starting polyol. The aqueous alkaline solution may have a pH of from about 8 to about 14 containing, for example, sodium hydroxide or potassium hydroxide. The mixture of the nitrile and polyol is maintained at a temperature of from about 10° C to about 120° C, preferably about 40° C, for a period of from about 1 to about 48 hours, particularly about 5 hours, and it is preferred that the mixture be stirred vigorously for the duration of the reaction period to give a homogeneous solution.

After completion of the conversion reaction, the so-formed modified polyol may be separated from the solution. However, it is preferred that the modified polyol be maintained in solution, and the amino resin precursor added to said solution. In accordance with the present invention, the timber bulking composition contains an amino resin precursor having reactive N-hydroxymethyl group. The composition, after application to timber as discussed in more detail below, is cured by heating during which the amino resin precursor reacts with the modified polyol to form a resin which fixes the wood in its swollen state.

Suitable amino resin precursors for use in the practice of the present invention include urea-formaldehyde resin precursors, modified cyclic urea-derived resin precursors, melamine formaldehydes, and similar classes of resin precursors containing reactive N-hydroxymethyl groups. Specific amino resin precursors which may be used include 4,5-dihydroxy-1,3-dihydroxymethyl-imidazolidin-2-one, which has the advantage that there is only a very small evolution of fumes on drying and curing. An especially preferred amino resin precursor is a urea-formaldehyde precursor. The urea-formaldehyde precursors have been found to give excellent stability in aqueous impregnating solutions made in accordance with this invention.

The molecular weight of the amino resin precursor should not be so low that it might crystallize out of aqueous solution, and it should not be so high as to seriously shorten the relatively long working life which the compositions of this invention can enjoy. In general, the molecular weight of the amino resin precursor may be from about 90 to about 1000, and preferably from about 100 to 400, especially about 200. It is preferred that the amount of amino resin precursor be from about 0.5 to about 2.0 moles per mole of modified polyol.

In accordance with a particularly preferred embodiment of this invention, the selected amino resin precursor and modified polyol have similar rates of penetration into the wood, so that the composition which actually enters the wood cells is comparable to the bulking composition outside the wood.

When using a urea-formaldehyde precursor, it is preferred that the precursor be provided as a mixture of urea in formaldehyde solution. Preferably, the formaldehyde is present in an amount of from about 2 to 4 moles per mole of urea.

In accordance with the invention, there is included in the composition a curing catalyst which catalyzes the reaction between the modified polyol or polyols and the amino resin precursor when the composition is heated following impregnation in the wood. The temperature of curing should be from about 60° C to about 120° C, and therefore, the curing catalyst should be effective at promoting the reaction when the composition is heated to a temperature in that range. Phosphoric acid has been found to be especially suitable for this purpose. Preferably, the catalyst is a latent acid, i.e., one which provides an acid under the curing conditions. Mono-ammonium dihydrogen phosphate is especially preferred. Illustrative of other useful catalysts are butyl acid phosphate and diammonium hydrogen phosphate. The catalyst is used in an amount effective to promote curing and may, for example, comprise from about 1, to about 8% by weight based on the weight of total solids in the composition, preferably about 5% by weight of total solids weight.

A polar solvent is included in the composition. Desirably, the curable components are all soluble in the selected solvent. The polar solvent should be one which will effect swelling of the wood. Illustrative polar solvents which may be used in the practice of the present invention include water and water-miscible lower alcohols, such as methanol and ethanol. Preferably, the polar solvent is water.

The composition should be passed through an acid ion exchange resin, for example, by techniques known in the art, to remove alkali metal ions from the composition. Thus, where the polyol conversion is effected in a sodium hydroxide solution, and the amino resin precursor thereafter added, the cooled solution may be passed through a column containing an acidic ion exchange resin, such as acidic ion exchange resins as are known in the art, to remove the sodium ions. The failure to remove sodium ions can lead to poor cure and low water resistance.

To insure sufficiently rapid penetration of the composition of this invention into the timber, the viscosity of the composition should be from about 1 to about 8, and preferably not above about 3 cs. To achieve the desired viscosity, the solids content of the solution should not usually be in excess of about 25–27%. A solution with a maxiumum solids content in this region gives good impregnation. In general, if the reactive components have too high a molecular weight or are too highly cross-linked, the composition cannot well penetrate the wood cells, and if the solids content is too low, impregnation gives a low resin loading in the bulked timber.

In accordance with the method of the present invention, timber can be bulked by impregnating the wood with the composition made in keeping with the teachings of the invention, drying the impregnated wood, and heating the dried wood to cure the composition. In general, any conventional impregnation technique can be used. Wood is preferably impregnated by subjecting it to a reduced pressure in a suitable vessel, for example, of 10 cm Hg, to remove air from the wood, introducing the composition and immersing the wood in the composition, and then allowing the pressure to return to atmospheric or raising the pressure to superatmospheric while the wood is still immersed with the composition. Using this vacuum impregnation, technique, it has been found that deep penetration of the composition desirably occurs.

During impregnation of the wood with the compositions of this invention, the best effects are obtained when the polar solvent first swells the wood, the curable components entering the wood cells together with the solvent so that when the wood is thereafter dried, the curable components react and fix the wood in its swollen state. In practice, it has been found that when wood is treated with the compositions of this invention, a volume swelling of about 7% occurs. The drying may be effected by heating in an oven or kiln or even in ambient atmosphere at room temperatures. Drying temperatures may be from about 50° C to about 80° C, particularly about 60° C, for a period of from about 12 hours to about 24 hours, especially about 18 hours.

The dried wood is then heated to promote curing of the reactive components of the composition. Curing temperature may be in the range of from about 60° C to about 120° C, preferably about 100° C, for a period of from about 2 to about 4 days, depending on the size of the timber.

An especially efficient procedure for drying and curing is to combine them in one operation wherein starting with a temperature of about 60° C, the impregnated wood piece is further heated gradually, over a 10 to 24 hour period, to the curing temperature, and then maintained at that temperature for 2 to 11 days.

Timber treated in accordance with the present invention has excellent dimensional stability and increased hardness. The more porous the wood material selected for treatment, the more effective is the bulking process. Sapwoods have been found to be particularly amenable to treatment by the present invention. The sapwood of Pinus Sylvestris has been found to be especially suitable. Any method of enhancing the porosity of the wood to be treated would comprise a suitable preliminary step to carrying out of the bulking operation here described. For example, sapwood can be rendered highly absorptive by bacterial action, as in the so-called "ponded sapwood", under conditions of wet storage in the presence of bacteria.

Specific examples of the invention are set forth below. These examples are merely illustrative of the invention and the underlying principles thereof and are not to be understood as limiting the scope of the invention in any way.

EXAMPLE 1

Sucrose (342 g. 1.0 mole) was dissolved in water (228 g) and a solution of sodium hydroxide (8 g, 0.2 mole) in water added. To the warm mixture (35° C) was added acrylonitrile (159 g, 3.0 moles) in one lot. The mixture was stirred vigorously for 1.5 hours to give a homogeneous solution. After a further 2 hours, a solution of urea (90 g, 1.5 moles) in formalin (490 ml of a 37% solution containing formaldehyde (180 g, 6.0 moles)) was added. After 1 hour the temperature of the mixture was raised to the boiling point and reflux maintained for 1 hour; then a portion (100 ml) of distillate was collected. The clear, cooled solution was passed through a column containing an acidic ion exchange resin. The solids content of the solution, determined by drying a weighed aliquot for 24 hours at 110° C, was 47% by weight.

Forty blocks of Pinus Sylvestris sapwood initially conditioned at 60% relative humidity (RH) and 20° C were thoroughly impregnated by a vacuum technique with a solution prepared as above containing mono-ammonium dihydrogen phosphate (5% by weight on resin solids) and having a total solids content of 27.5% by weight. The blocks were force dried and cured by heating at 110° C for 4 days, and finally reconditioned at 60% RH and 20° C. The treated blocks with a mean resin loading of 37.6% by weight on dry wood substance had a final mean specific gravity of 0.63 compared to an initial value of 0.53. The volumetric shrinkage from the fully swollen state after impregnation to the final state was 33% of the swelling observed on going from the initial to the fully swollen state. This left a net overall gain in volume of 7%. No splitting of the wood occurred during force drying.

The dimensional changes of treated and untreated blocks were compared by exposing blocks initially conditioned at 60% RH and 20° C to atmospheres nominally at 0 and 100% RH. Shrinkage of the treated blocks under dry conditions was 42% that of the controls, while the expansion under moist conditions was 72% that of the controls. The overall reduction in dimensional movement from fully dried to fully swollen states for treated block compared to control blocks was 40%.

Unlike wood treated with simple water-soluble bulking agents, the treated wood was non-deliquescent when exposed to saturated water vapor. When the treated wood was saturated with water by vacuum impregnation, leached for several weeks, and then dried at 110° C for 1 day, the weight loss amounted to only 30% of the resin originally present.

Several tests confirmed the increased hardness of the treated wood, especially of the springwood which is very soft in the untreated wood.

The treated wood was readily worked, accepted screws readily, and had excellent compatibility for a wide range of wood primers and varnishes, even under wet conditions.

EXAMPLE 2

Sucrose (342 g, 1.0 mole) was dissolved in water (228 g) and a solution of sodium hydroxide (8 g, 0.2 mole) in water (20 g) was added. To the warm mixture (35° C) was added acrylonitrile (159 g, 3.0 moles) in one lot. The mixture was stirred vigorously for 1.5 hours to give a homogenous solution. After a further 2 hours the temperature was raised to the boiling point and reflux maintained for 1 hour, and then a portion (100 ml) of distillate was collected. The clear, cooled solution was passed through a column containing an acidic ion-exchange resin. The solids content of the solution, determined by drying a weighed aliquot for 24 hours at 110° C, was 58% by weight. The infrared spectrum of the dried product indicated the presence of very little unreacted nitrile but showed strong primary amide bands.

This solution was blended with a commercial preparation of 4,5-dihydroxy-1, 3-dihydroxymethyl-imidazolidin-2-one (Fixapret CPNS of BASF (UK) Ltd.) in molar proportions of 1 of sucrose plus 3 of acrylonitrile to 0.5 to 1.5 of the amino resin precursor. These compositions were of good stability and low viscosity.

Wood was treated with such a composition to which mono-ammonium dihydrogen phosphate (5% by weight of resin solids) had been added and in the manner described in Example 1 with essentially similar results. However, an advantage of these compositions was that shorter curing times or lower curing temperatures were feasible, for example 2 days at 110° C or 4 days at 110° C. Furthermore the compositions used in this Example gave much reduced formaldehyde fumes during the initial stages of curing as compared with the composition used in Example 1.

In order to discover the optimum concentrations and viscosities of compositions of the invention, blocks of redwood softwood were impregnated with the compositions of varying solids content prepared generally as described in Examples 1 and 2 by immersing them in the composition, subjecting them to a vacuum for 25 minutes and leaving them immersed for 10 minutes from the time of vacuum release. They were then weighed, dried overnight at 110° to 115° C, and reweighed. Solution uptakes and loading of cured resin were calculated.

Viscosities of the solutions were determined using a suspended level viscometer (No. 1 size) and all measurements made at 18° C.

The results are listed in the following Table I.

TABLE 1

| Composition of Example | Solution Concentration Resin *solids (% w/w/) | % solution + absorbed | % loading of ++ cured resin | Viscosity of solution (cS) |
|---|---|---|---|---|
| 1 | 10 | 156.7 | 17.7 | 1.450 |
| 1 | 20 | 115.0 | 25.6 | 2.172 |
| 1 | 25 | 102.2 | 28.3 | 2.760 |
| 1 | 30 | 85.2 | 27.8 | 3.700 |
| 1 | 40 | 66.9 | 28.9 | 8.034 |
| 2 | 10 | 164.1 | 18.0 | 1.372 |
| 2 | 20 | 120.8 | 26.3 | 1.934 |

TABLE 1-continued

| Composition of Example | Solution Concentration Resin *solids (% w/w/) | % solution + absorbed | % loading of ++ cured resin | Viscosity of solution (cS) |
|---|---|---|---|---|
| 2 | 25 | 109.0 | 29.4 | 2.395 |
| 2 | 30 | 91.7 | 30.2 | 3.314 |
| 2 | 40 | 80.6 | 34.3 | 6.225 |

*5% mono-ammonium dihydrogen phosphate added based on weight of resin solids present
+ based on initial weight of wood.
++ based on oven dry weight of wood.

As can be seen from these results the resin loading in the treated timber does not increase significantly when the solids content of the composition of the invention exceeds about 25 to 27% by weight and when the viscosity of the composition of the invention does not exceed about 3 cS. It is desirable therefore for the compositions of the invention to have viscosities of about 3 cS and solids contents of about 25 to 27% by weight to give good loading of the curable components while retaining good long term storage stability and excellent penetration of timber.

The mechanical properties of blocks of wood treated as described in Example 1 were determined by the methods described in British Standard B. S. 373 as follows:

i. Static Bending Test: the strength properties measured in this test are the modulus of rupture, modulus of elasticity, work to maximum load and total work.

ii. Impact Bending Test: a hammer is dropped on the specimen from progressively increasing heights until complete failure occurs or a deflection of 60 mm is reached; the maximum drop of the hammer indicates the resistance of a timber to a suddenly applied load; it is a measure of toughness and is related to "total work" in the static bending test.

iii. The Janka indentation hardness test: which measures the resistance offered to indentation by a hardened steel tool rounded to a diameter of 11.3 mm and embedded into the test piece to half its diameter; it is a measure of hardness and correlates with compression strength perpendicular to the grain.

The results found as compared with untreated blocks of wood as the means of 10 samples are listed below in Table II.

TABLE 2

| Test | Treated | Untreated |
|---|---|---|
| Static Bending Test: | | |
| Equivalent Fiber Stress at maximum load (N/mm$^2$) | 97.4 | 94.5 |
| Fiber Stress at limit of proportionately (N/mm$^2$) | 73.2 | 42.9 |
| Modulus of Elasticity (N/mm$^2$) | 11,750 | 9,638 |
| Impact Bending Test: | | |
| Height of drop (cm) | 41 | 81 |
| Hardness Test: | | |
| Hardness (Kg/m$^3$) | | |
| Tangential | 4,313 | 3,452 |
| Radial | 4,207 | 3,430 |

As can be seen from these results, there is a distinct hardening and stiffening of the treated timber as compared with untreated timber. At the same time, however, there is an increase in embrittlement for the treated timber. This increased embrittlement is not of great importance, however, as compared with the increases in hardness and stiffness for many uses of the treated timber, e.g., wood block flooring, where the very much cheaper softwood can be treated according to the invention to give a material which is still cheaper than natural hardwoods but of comparable mechanical properties such as strength and indentation resistance.

Timber of all sizes can be successfully treated by the compositions and method of this invention. Blocks 2" × 3" × ⅝" and 4" × 4" × ⅝" have been used as has been board 2' × 6" × ⅝", demonstrating the wide applicability of this invention.

Those skilled in the art will recognize from the description herein various obvious modifications which can be made in the present invention without departing from the scope or spirit of the invention or the principles thereof.

What is claimed is:

1. A composition suitable for use in bulking timber comprising:
    a. at least one modified polyol in which at least two of the free hydroxyl groups have been converted to -0-3-alkyleneamido ether groups;
    b. an amino resin precursor containing reactive N-hydroxymethyl groups;
    c. a curing catalyst for catalyzing the curing of the composition when heated; and
    d. a polar solvent capable of swelling wood.

2. A composition according to claim 1 in which the -0-3-alkyleneamido ether groups are -0-3-propionamide ether groups.

3. A composition according to claim 1 in which there is at least one polyol selected from the group consisting of sucrose, sorbitil, mannitol and glycerol, which polyoly has been modified by conversion of at least two of the free hydroxyl groups to -0-3-alkyleneamido ether groups.

4. A composition according to claim 3 in which the polyol is sucrose which has been modified by conversion of at least two of the free hydroxyl groups to -0-3-alkyleneamido groups.

5. A composition according to claim 4 in which the sucrose has been modified by conversion of at least two of the free hydroxyl groups to -0-3-propionamido ether groups.

6. A composition according to claim 1 in which the amino resin precursor is selected from the group consisting of a mixture comprising urea and formaldehyde, a mixture comprising melamine and formaldehyde, and a modified cyclic urea-derived resin precursor.

7. A composition according to claim 1 in which the curing catalyst is an acid or latent acid catalyst.

8. A composition according to claim 7 in which the curing catalyst is selected from the group consisting of phosphoric acid, butyl acid phosphate, mono-ammonium dihydrogen phosphate, and diammonium hydrogen phosphate.

9. A composition according to claim 8 in which the curing catalyst is mono-ammonium dihydrogen phosphate.

10. A composition according to claim 1 in which the polar solvent is selected from the group consisting of water, methanol and ethanol.

11. A composition suitable for use in bulking timber comprising:
- a. at least one modified sucrose in which at least two of the free hydroxyl groups have been converted to -0-3-propionamido ether groups;
- b. a urea-formaldehyde resin precursor; said precursor being present in an amount of from about 0.5 to about 2.0 moles per mole of modified sucrose;
- c. a curing catalyst for catalyzing the curing of the composition when heated, said catalyst selected from the group consisting of phosphoric acid and mono-ammonium dihydrogen phosphate, and said catalyst being present in an amount effective to promote curing; and
- d. a polar solvent capable of swelling the timber.

\* \* \* \* \*

UNITED STATES PATENT OFFICE
CERTIFICATE OF CORRECTION

Patent No. 4,005,039             Dated January 25, 1977

Inventor(s) DUNCAN GARDINER

It is certified that error appears in the above-identified patent and that said Letters Patent are hereby corrected as shown below:

In claim 3, col. 10, line 45, change "sorbitil" to --sorbitol-- and line 46, change "polyoly" to --polyol--.

Signed and Sealed this

Tenth Day of May 1977

[SEAL]

Attest:

RUTH C. MASON
Attesting Officer

C. MARSHALL DANN
Commissioner of Patents and Trademarks